United States Patent Office 2,924,524
Patented Feb. 9, 1960

2,924,524
SWINE FEED SUPPLEMENT

Jerome L. Martin, Terre Haute, Ind., assignor to Commercial Solvents Corporation, Terre Haute, Ind., a corporation of Maryland No Drawing. Application January 29, 1958
Serial No. 711,774

14 Claims. (Cl. 99—2)

My invention relates to a swine feed additive, and more particularly, it relates to swine feeds containing a compound having the following structural formula:

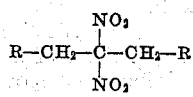

where R is a radical selected from the group consisting of hydrogen, lower alkyl, hydroxy, lower hydroxy alkyl, carbamyl, and lower carbamyl alkyl.

Epicures have long praised the low fat content of bacon from Denmark, while ignoring the fatty bacon generally produced on the North American continent. Danish farmers feed their pigs large amounts of milk. This high protein feed produces lean, muscular pigs having little back fat. American farmers prefer to feed their swine diets containing large amounts of cheap energy sources such as corn, milo, barley, etc. in spite of the fact that the resulting pig does not bring the highest market prices due to the fact that hams and bacon containing excessive amounts of fat do not sell well.

I have now discovered that swine fed the above-described dinitro compounds are leand and show a decided decrease in the amount of back fat formed during growth, while maintaining essentially the same degree of feed utilization and rate of growth.

Compounds coming within the above-described structural formula include: 2,2-dinitropropane, 2,2-dinitrobutane, 2,2-dinitro-1-propanol, 2,2-dinitro-1-propanol carbamate, 2,2-dinitro-1,3-propanediol dicarbamate, 3,3-dinitropentane, 3,3-dinitro-1-pentanol, 3,3-dinitro-2-pentanol, etc.

My additives may be fed to swine as part of complete feeds or as part of a supplement for the carbohydrate source. Generally, the supplements contain from about 36 to about 40% protein, and vitamins, minerals, and other nutritive additives which form a balanced diet when fed to swine with a particular carbohydrate source. Generally, swine growers prefer to feed the carbohydrate and the protein feed supplement separtely, as the swine, through free choice, generally eat sufficient amounts of the protein supplement to obtain a balanced diet. From about 25 to about 2500 grams of my active ingredients are needed per ton of supplement where the carbohydrate source and supplement are fed separtaely. About 5 to about 500 grams of my active ingredients are needed per ton of complete swine feed. If these amounts of my active ingredients are added to the complete feed and supplement the swine exhibit a reduction in back fat of about 5 to about 15% and there is no marked decrease in feed utilization efficiency or rate of growth.

It is to be understood that not all of my compounds are active to the same degree and that the active ingredients of my invention may be utilized individually or as mixtures.

The following example is given to illustrate my invention, but it is not intended that my invention be limited to the procedures, amounts of active ingredients, or described rations, but rather it is intended that all equivalents obvious to those skilled in the art be included within the scope of my invention.

EXAMPLE I

The efficacy of my invention can be easily demonstrated by feeding pigs complete feeds containing 75 g./ton of 2,2-dinitro-1,3-propanediol and 2,2-dinitro-1-propanol and comparing the depth of back fat with the back fat of pigs fed the same complete feed containnig no additives, duplicate groups of pigs being fed in each case. Different feed formulas are fed to the pigs at various times during their growth. Thus, a high protein content feed is fed to the younger pigs while a high carbohydrate content feed is fed to the pigs during the final stages of growth when the pigs are being fattened for market. When the pigs weigh between 45–75 pounds the following complete feed is fed:

Swine Formula A

| | | |
|---|---|---|
| Ground yellow corn | lb__ | 1510 |
| Meat and bone scraps, 50% | lb__ | 50 |
| Soybean oil meal, 44% | lb__ | 350 |
| Dehydrated alfalfa meal, 17% | lb__ | 50 |
| Ground limestone | lb__ | 10 |
| Dicalcium phosphate | lb__ | 20 |
| Trace mineral salt | lb__ | 12 |
| Riboflavin feed supplement (3.6 g./lb. riboflavin) | lb__ | 0.5 |
| Choline feed supplement (25% choline chloride) | lb__ | 2 |
| Propionic acid fermentation residues (6 mg./lb. vitamin $B_{12}$) | lb__ | 2.5 |
| Vitamin $D_2$ (4 million I.U./lb.) | grams__ | 91 |
| Calcium pantothenate | do____ | 6 |
| Niacin | do____ | 15 |
| Baciferm-PB–10 (zinc bacitracin, 7.5 g./lb. and procaine penicillin 2.5 g./lb.) | lb__ | 2.5 |
| Aureomycin supplement (10 g./lb.) | lb__ | 1.25 |
| Terramycin supplement (10 g./lb.) | lb__ | 1.25 |

Calculated analysis:

| | | |
|---|---|---|
| Protein | percent__ | 16.1 |
| Fat | do____ | 3.2 |
| Fiber | do____ | 3.7 |
| Calcium | do____ | 0.78 |
| Phosphorus | do____ | 0.60 |
| Vitamin A | I.U./lb__ | 3620 |
| Vitamin $D_2$ | I.U./lb__ | 400 |
| Riboflavin | mg./lb__ | 1.74 |
| Pantothenic acid | mg./lb__ | 6.15 |
| Niacin | mg./lb__ | 16.17 |
| Choline | mg./lb__ | 500 |
| Vitamin $B_{12}$ | µg./lb__ | 7.5 |
| Lysine | percent__ | 0.71 |
| Tryptophan | do____ | 0.16 |
| Methionine | do____ | 0.31 |
| Cystine | do____ | 0.24 |

Between 75–125 pounds the following complete feed was utilized:

Swine Formula B

| | | |
|---|---|---|
| Ground yellow corn | lb__ | 1640 |
| Meat and bone scraps, 50% | lb__ | 50 |
| Soybean oil meal, 44% | lb__ | 230 |
| Dehydrated alfalfa meal, 17% | lb__ | 50 |
| Ground limestone | lb__ | 12 |
| Dicalcium phosphate | lb__ | 10 |
| Trace mineral salt | lb__ | 12 |
| Riboflavin feed supplement (3.6 g./lb. riboflavin) | lb__ | 0.4 |
| Choline feed supplement (25% choline chloride) | lb__ | 1.0 |

| | | |
|---|---|---|
| Propionic acid fermentation residues (6 mg./lb. vitamin B$_{12}$) | lb | 1.7 |
| Vitamin D$_2$ (4 million I.U./lb.) | grams | 69 |
| Calcium pantothenate | do | 5 |
| Niacin | do | 12 |
| Baciferm-PB-10 (zinc bacitracin, 7.5 g./lb. and procaine penicillin 2.5 g./lb.) | do | 227 |
| Aureomycin supplement (10 g./lb.) | do | 113 |
| Terramycin supplement (10 g./lb.) | do | 113 |

Calculated analysis:

| | | |
|---|---|---|
| Protein | percent | 14.0 |
| Fat | do | 3.4 |
| Fiber | do | 3.5 |
| Calcium | do | 0.67 |
| Phosphorus | do | 0.49 |
| Vitamin A | I.U./lb. | 3718 |
| Vitamin D$_2$ | I.U./lb. | 300 |
| Riboflavin | mg./lb. | 1.51 |
| Pantothenic acid | mg./lb. | 5.48 |
| Niacin | mg./lb. | 15.2 |
| Choline | mg./lb. | 386 |
| Vitamin B$_{12}$ | μg./lb. | 5 |
| Lysine | percent | 0.54 |
| Tryptophan | do | 0.13 |
| Methionine | do | 0.29 |
| Cystine | do | 0.21 |

Between 125–200 pounds the following complete feed is utilized:

Swine Formula C

| | | |
|---|---|---|
| Ground yellow corn | lb | 1750 |
| Meat and bone scraps, 50% | lb | 50 |
| Soybean oil meal, 44% | lb | 120 |
| Dehydrated alfalfa meal, 17% | lb | 50 |
| Ground limestone | lb | 15 |
| Dicalcium phosphate | lb | 7 |
| Trace mineral salt | lb | 12 |
| Riboflavin feed supplement (3.6 g./lb. riboflavin) | lb | 0.4 |
| Choline feed supplement (25% choline chloride) | lb | 1 |
| Propionic acid fermentation residues (6 mg./lb. vitamin B$_{12}$) | lb | 1.7 |
| Vitamin D$_2$ (4 million I.U./lb.) | grams | 69 |
| Calcium pantothenate | do | 5 |
| Niacin | do | 12 |
| Baciferm-PB-10 (zinc bacitracin, 7.5 g./lb. and procaine penicillin 2.5 g./lb.) | grams | 227 |
| Aureomycin supplement (10 g./lb.) | do | 113 |
| Terramycin supplement (10 g./lb.) | do | 113 |

Calculated analysis:

| | | |
|---|---|---|
| Protein | percent | 12.03 |
| Fat | do | 3.62 |
| Fiber | do | 3.26 |
| Calcium | do | 0.68 |
| Phosphorus | do | 0.45 |
| Vitamin A | I.U./lb. | 3800 |
| Vitamin D$_2$ | I.U./lb. | 303 |
| Riboflavin | mg./lb. | 1.47 |
| Pantothenic acid | mg./lb. | 5.31 |
| Niacin | mg./lb. | 15.24 |
| Choline | mg./lb. | 330 |
| Vitamin B$_{12}$ | μg./lb. | 5 |
| Lysine | percent | 0.42 |
| Tryptophan | do | 0.11 |
| Methionine | do | 0.25 |
| Cystine | do | 0.18 |

The amount of back fat formed on the pigs is determined by taking measurements of the fat depth when the pigs weigh about 200 pounds. The fat depth is measured by means of a Duncan Electric Manufacturing Company Lean Meter. This instrument uses the electrical conductivity differential between fat and muscle to indicate whether the measuring needle is embedded in adipose tissue or in muscle. The measured depth of needle penetration, less skin thickness, determines the thickness of fatty deposits.

In each instance the additive-containing feeds give a 7–8% decrease in depth of back fat when the pigs are compared with pigs fed the described complete feeds containing no additives.

Now having described my invention, what I claim is:

1. A swine feed containing as an essential active ingredient a small but effective amount to reduce the formation of adipose tissue of a compound having the following structural formula:

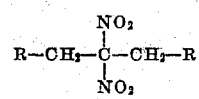

where R is a radical selected from the group consisting of hydrogen, lower alkyl, hydroxy, lower hydroxy alkyl, carbamyl, and lower carbamyl alkyl.

2. A nutrient feed for swine containing as an essential active ingredient a small but effective amount to reduce the formation of adipose tissue of a compound selected from the group consisting of compounds having the following structural formula:

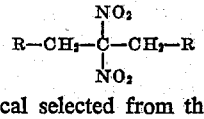

where R is a radical selected from the group consisting of hydrogen, lower alkyl, hydroxy, lower hydroxy alkyl, carbamyl, and lower carbamyl alkyl; and mixtures thereof.

3. A swine feed comprising from about 0.0005 to 0.06% of a compound having the following structural formula:

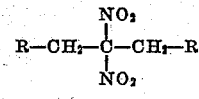

where R is a radical selected from the group consisting of hydrogen, lower alkyl, hydroxy, lower hydroxy alkyl, carbamyl, and lower carbamyl alkyl in a nutrient.

4. A swine feed supplement comprising from about 0.0025 to 0.30% of a compound having the following structural formula:

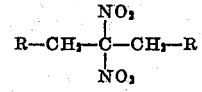

where R is a radical selected from the group consisting of hydrogen, lower alkyl, hydroxy, lower hydroxy alkyl, carbamyl, and lower carbamyl alkyl in a nutrient.

5. A process for the production of swine having decreased amounts of back fat which comprises feeding said swine a nutrient feed containing a small but effective amount to reduce the formation of adipose tissue of a compound having the following structural formula:

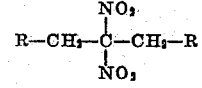

where R is a radical selected from the group consisting of hydrogen, lower alkyl, hydroxy, lower hydroxy alkyl, carbamyl, and lower carbamyl alkyl.

6. A process for the production of swine having decreased amounts of adipose tissue which comprises feeding said swine a nutrient feed containing from about 0.0005 to about 0.06% of a compound having the following structural formula:

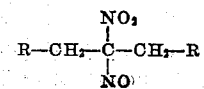

where R is a radical selected from the group consisting of hydrogen, lower alkyl, hydroxy, lower hydroxy alkyl, carbamyl, and lower carbamyl alkyl.

7. A process for the production of swine which comprises feeding said swine corn and a nutrient ration containing from about 0.0025 to about 0.30% of a compound having the following structural formula:

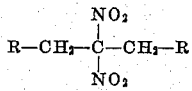

where R is a radical selected from the group consisting of hydrogen, lower alkyl, hydroxy, lower hydroxy alkyl, carbamyl, and lower carbamyl alkyl.

8. A swine feed comprising from about 0.0005 to about 0.30% of 2,2-dinitropropane in a nutrient.

9. A swine feed comprising from about 0.0005 to about 0.30% of 2,2-dinitro-1-propanol in a nutrient.

10. A swine feed comprising from about 0.0005 to about 0.30% of 2,2-dinitro-1-propanol discarbamate in a nutrient.

11. A swine feed comprising from about 0.0005 to about 0.30% of 2,2-dinitro-1,3-propanediol in a nutrient.

12. A swine feed comprising from about 0.005 to about 0.30% of 2,2-dinitro-1,3-propanediol dicarbamate in a nutrient.

13. A swine feed comprising from about 0.0005 to about 0.30% of 2,2-dinitrobutane in a nutrient.

14. A swine feed comprising from about 0.0005 to about 0.30% of 2,2-dinitro-1-butanol in a nutrient.

References Cited in the file of this patent

Wilkins: Annals of N.Y. Academy of Sciences 59 (1954), pp. 36–44.

Slater et al.: Jr. Am. Pharm. Assoc. Scient. ed. 43 (1954), pp. 547–50.

Agr. News Letter, Du Pont de Nemours & Co., summer 1957, vol. 25, pp. 3 and 4.